Aug. 3, 1948.   J. C. PEMBERTON   2,446,191
SWITCHING MECHANISM FOR ELECTRICAL COMPUTERS
Filed March 16, 1946   3 Sheets-Sheet 1

INVENTOR.
J. C. PEMBERTON
BY
Christie & Angus
ATTORNEYS

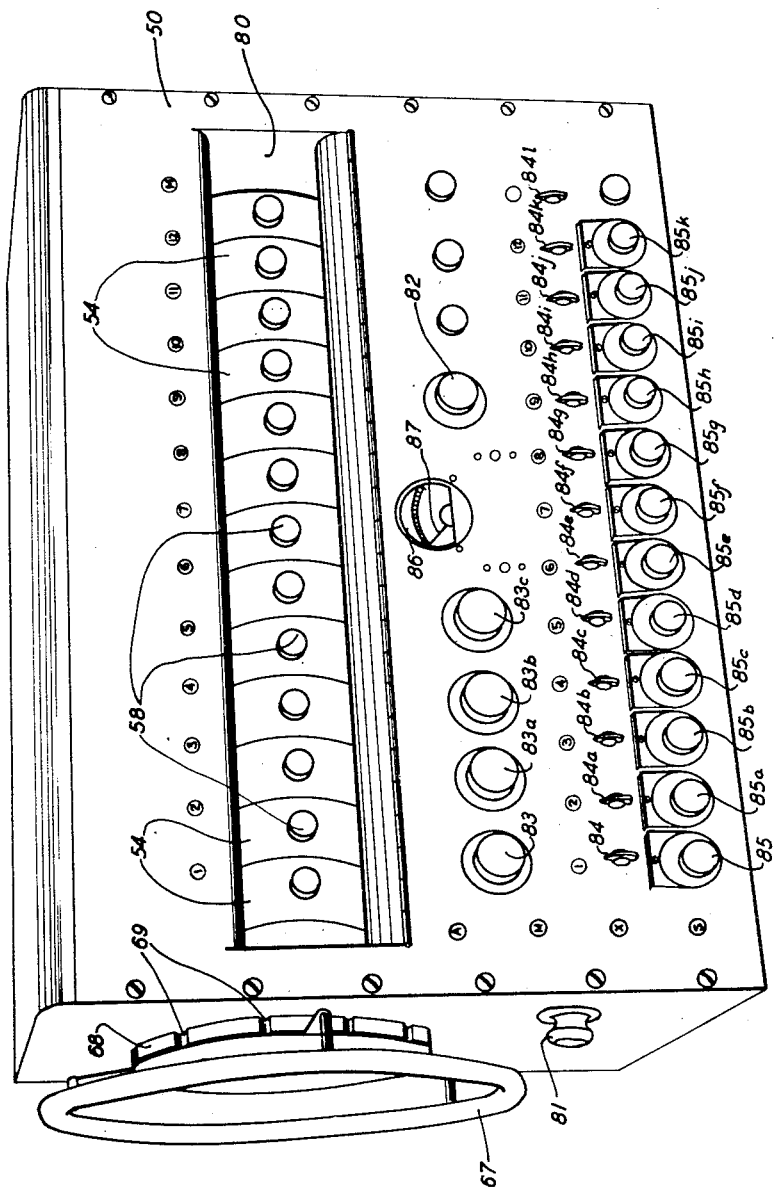

Aug. 3, 1948. J. C. PEMBERTON 2,446,191
SWITCHING MECHANISM FOR ELECTRICAL COMPUTERS
Filed March 16, 1946 3 Sheets-Sheet 3
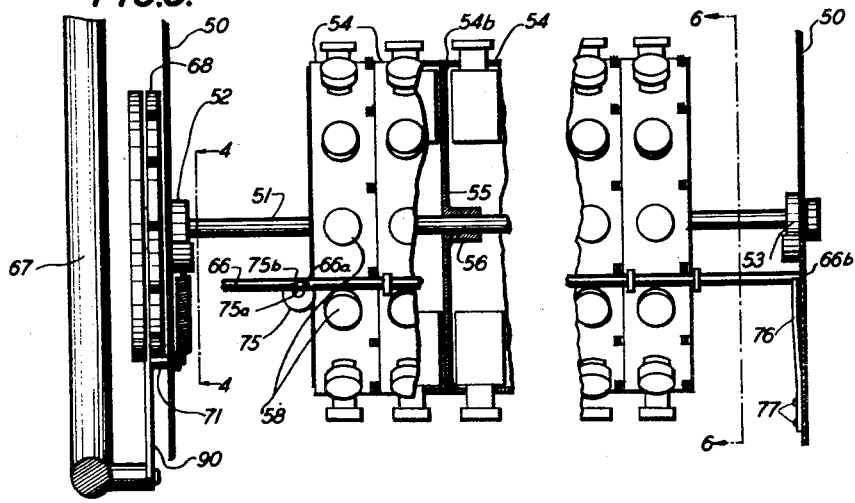
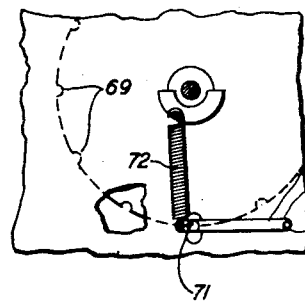
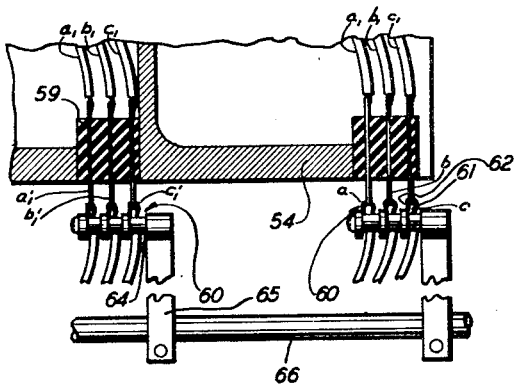
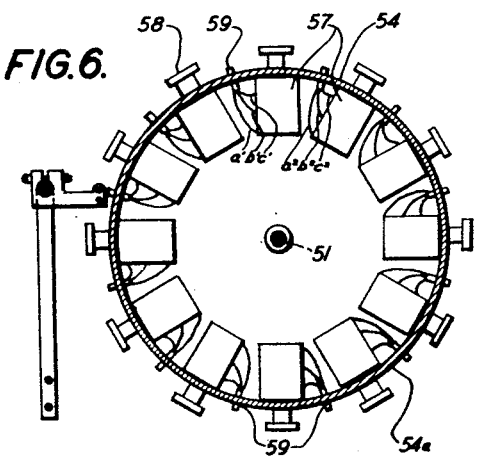
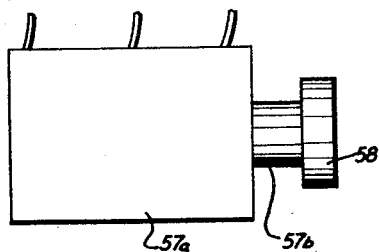
INVENTOR.
J. C. PEMBERTON
BY Christie & Angus
ATTORNEYS Patented Aug. 3, 1948

2,446,191

UNITED STATES PATENT OFFICE 2,446,191

SWITCHING MECHANISM FOR ELECTRICAL COMPUTERS

J C Pemberton, Pasadena, Calif., assignor to Consolidated Engineering Corporation, Pasadena, Calif., a corporation of California Application March 16, 1946, Serial No. 655,003

9 Claims. (Cl. 201—48)

This invention relates to electrical switch mechanisms and especially to switching mechanisms of the type adapted successively to switch a plurality of circuits.

My invention is particularly applicable in connection with electrical computing systems of the type comprising adjustable-tap potentiometers adapted for the solution of simultaneous equations.

In the copending applications of Clifford E. Berry, Serial No. 561,192, filed October 31, 1944, and Serial No. 610, 457, filed August 13, 1945, and in Wilcox application Serial No. 614,550, (now Pat. #2,417,098) filed September 5, 1945, all assigned to the same assignee as the present application, there are described electrical computing systems adapted for arriving at the solutions for the equations. The known equation quantities are set up on potentiometers or voltage dividers. Those quantities which are multiplied together are set up on multiplying combinations of potentiometers or voltage dividers, and those quantities which are to be added according to the requirements of the equations are added by the use of an addition network for adding voltages. The solutions are obtained by adjusting potentiometer or voltage dividers until the required additions are indicated.

Such computing systems ordinarily comprise a number of potentiometer systems, according to the number of equations in the group being solved; and this has required switching from one set of potentiometers, representing one equation, to the next set of potentiometers representing the next equation. Pursuant to each switching operation, new values or settings of the unknowns are obtained and each new setting brings the value set up for the unknown closer to the final equation solution. This performance of switching from one set of potentiometers to another for the successive equations, and repeating the operation over again, and converging toward the ultimate solutions, is known as the iterative method of computation.

This iterative method involves considerable switching and corresponding inconvenience, particularly when there are many equations to be solved. According to my invention, I provide a switching arrangement providing much greater convenience and facility of operation than in heretofore used switching systems. I carry out my invention by the arrangement of the potentiometers or voltage dividers which represent known values, on a turret device which is rotatable so that it may be turned successively to present to the operator the adjustable-potentiometer tap arms of all of the potentiometers representing the knowns of each successive equation. Provision is made so that as each successive group of the potentiometers is brought into the operating position, the potentiometers of the group are switched into the computing system.

The foregoing and other features of my invention will be better understood from the following description taken in conjunction with the accompanying drawing, of which:

Fig. 2 is a perspective view of a cabinet including the circuit elements of Fig. 1 and showing the arrangement of the various adjustable members on a panel, and including a turret arrangement according to my invention;

Fig. 3 is a view partly in section, of the turret mechanism included in Fig. 2;

Fig. 4 shows a detail of the turret detent mechanism;

Fig. 5 is a detail view of switching means used with the rotating turret of Fig. 3;

Fig. 6 is an end view showing the turret arrangement and its associated mechanism; and Fig. 7 shows a potentiometer of a type suitable for use with the turret.

Fig. 1 shows an electrical computing system of the iterative type which is the same as described in said applications Serial Nos. 561,192, 610,457, and 614,550 (now Pat. #2,417,098). The system shown in Fig. 1 is no part of my present invention, but is explained in some detail to facilitate understanding the application of my novel switching system to it.

Figure 1:
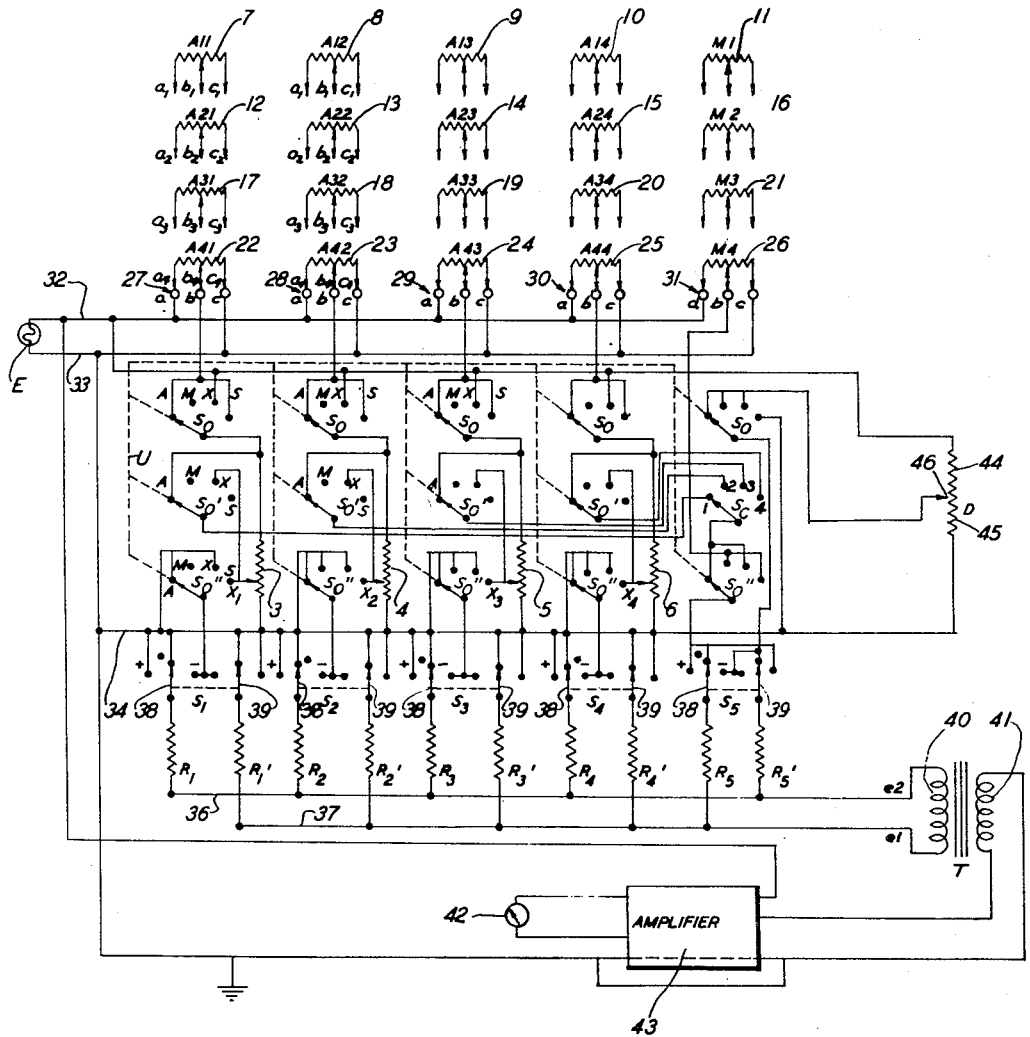
Fig. 1 is a schematic electrical diagram showing a computing system adapted to solve for several simultaneous equations.

The system is adapted to solve for four unknowns, $X_1$, $X_2$, $X_3$ and $X_4$, in the following simultaneous equations:

$$A_{11}X_1 + A_{12}X_2 + A_{13}X_3 + A_{14}X_4 = M_1 \quad (1)$$
$$A_{21}X_1 + A_{22}X_2 + A_{23}X_3 + A_{24}X_4 = M_2 \quad (2)$$
$$A_{31}X_1 + A_{32}X_2 + A_{33}X_3 + A_{34}X_4 = M_3 \quad (3)$$
$$A_{41}X_1 + A_{42}X_2 + A_{43}X_3 + A_{44}X_4 = M_4 \quad (4)$$

in which all of the quantities except $X_1$, $X_2$, $X_3$ and $X_4$ are known. The unknown quantity $X_1$ is represented by the proportion of the voltage across potentiometer 3 which exists between ground and the tap of the potentiometer. The unknown quantity $X_2$ is represented by the proportion of the voltage across potentiometer 4 which exists between ground and the potentiometer tap. The unknown quantity $X_3$ is represented by the proportion of the voltage across potentiometer 5 which exists between ground and the potentiometer tap. The unknown quantity $X_4$ is represented by the proportion of the voltage across potentiometer 6 which exists between ground and the potentiometer tap.

The set of potentiometers 7, 8, 9, 10 and 11 are for the known quantities of Equation 1, the quantity $A_{11}$ being represented by the proportion of the voltage across potentiometer 7 between the tap and ground, and the other known quantities being similarly marked on their respective potentiometers. In a similar fashion, the set of potentiometers 12, 13, 14, 15 and 16 represent the known quantities of Equation 2; and the set of potentiometers 17, 18, 19, 20 and 21 are for the known quantities in Equation 3 as marked on the potentiometers; and the set of potentiometers 22, 23, 24, 25 and 26 are for the known quantities in Equation 4.

The individual potentiometers of each of the four sets of potentiometers are adapted successively to be switched to respective sets of switch contacts 27, 28, 29, 30 and 31. Each of the sets of switch contacts comprises three individual contacts $a$, $b$ and $c$; and these are arranged to engage successively the corresponding contacts $a_1$, $b_1$, $c_1$ of potentiometers 7 to 11, and the contacts $a_2$, $b_2$, $c_2$ of potentiometers 12 to 16, and $a_3$, $b_3$, $c_3$ of potentiometers 17 to 21, and contacts $a_4$, $b_4$, $c_4$ of potentiometers 22 to 26.

The switching mechanism shown in Figs. 2, 3, 4, 5 and 6 shows an arrangement according to my invention for successively switching into contact with the switch point sets 27 to 31, the respective ones of the four rows of potentiometers representing the known values of each of the four equations.

Each of the switch points $a$ and $c$ is connected across a pair of bus bars 32 and 33 across which is impressed a suitable voltage which may for example be a source of alternating voltage of a frequency of for example, 60 cycles per second. A voltage of about 20 volts has been found convenient; but some other voltage might be used instead, if desired. The middle contact $b$ of each switch set is adapted to be connected to a separate one of the X potentiometers 3 to 6. Thus contact $b$ of switch set 27 is adapted to be connected to the upper end of potentiometer 3. Contact $b$ of switch set 28 is adapted to be connected to the upper end of potentiometer 4; contact $b$ of switch set 29 is adapted to be connected to the upper end of potentiometer 5; and contact $b$ of switch set 30 is adapted to be connected to the upper end of potentiometer 6. The opposite ends of potentiometers 3, 4, 5 and 6 are connected to a common conductor 34, which is grounded and connected to bus bar 33, as shown.

The switch contacts $b$, instead of being connected directly to their respective X potentiometers, are connected through the A contacts of a set of selector switches $S_0$. There is one of these $S_0$ selector switches for each of the switch sets 27, 28, 29, 30 and 31. Each of the switches $S_0$ has four switch contacts designated A, M, X and S. The arrangement is such that the selector arms of the switches $S_0$ are adapted to be moved in unison by a suitable uni-control device U, so that all the arms are either on the A, M, X or S contact of all the $S_0$ switches. When the arms are on the A contacts as shown in Fig. 1, the taps of the respective A and M potentiometers are connected with the upper ends of the respective X potentiometers.

There are also provided two other sets of selector switches $S'_0$ and $S''_0$, there being a separate $S'_0$ switch and a separate $S''_0$ switch for each $S_0$ switch. Each switch of these $S'_0$ and $S''_0$ groups contains four contacts, A, M, X and S, similar to those of the $S_0$ switches. There is one less $S'_0$ switch than there is $S_0$ and $S''_0$ switches, inasmuch as there is no $S'_0$ switch for the M potentiometers. All of the $S'_0$ and $S''_0$ switches are tied into the same uni-control mechanism U as are the $S_0$ switches so that they are all always either on the A, M, X or S contacts of all the switches. The function of the several groups of these selector switches and their several contacts will be more fully explained hereinbelow.

The combinations of the A potentiometers and their respective X potentiometers connected to them through the A selector switch contacts and the $b$ contact points are voltage multiplying combinations, as is more fully explained in the said Berry applications Serial Nos. 561,192 and 610,457. The voltage between ground and the tap of the X potentiometer is equal to the voltage across the corresponding A potentiometer multiplied by the fraction of the total voltage across the A potentiometer which lies between ground and its tap and by the fraction of the total voltage across the X potentiometer which lies between ground and its tap.

Considering one of these voltage multiplying combinations, for example, that of potentiometer 22 and 3 connected through contact A of the $S_0$ switch, as shown in Fig. 1, the output voltage $E_0$ between ground and the tap of potentiometer 3 is given by the product equation:

$$E_0 = F.G.E$$

where F is the fraction of the total voltage across potentiometer 22 which is between ground and its tap $b_4$; and G is the fraction of the total voltage across potentiometer 3 which is between ground and tap $X_1$; and E is the voltage across potentiometer 22.

For the purpose of adding the voltages at the taps of the several X potentiometers in accordance with the summations called for by the simultaneous equation, there are provided a number of equal resistance elements, $R_1$, $R_2$, $R_3$, $R_4$, $R_5$ and $R_1'$, $R_2'$, $R_3'$, $R_4'$, and $R_5'$. The arrangement is like that described and claimed in the co-pending application, Serial No. 614,550, (now Pat. #2,417,098) filed September 5, 1945, in the name of Doyle E. Wilcox. As described in the said Wilcox application, there is a pair of these resistors for each X potentiometer, and also a pair for the column of M potentiometers. Thus, resistors $R_1$ and $R_1'$ are for potentiometer 3; resistors $R_2$ and $R_2'$ are for potentiometer 4; resistors $R_3$ and $R_3'$ are for potentiometer 5; resistors $R_4$ and $R_4'$ are for potentiometer 6; and resistors $R_5$ and $R_5'$ are for the M potentiometer. The lower end of resistors $R_1$, $R_2$, $R_3$, $R_4$, and $R_5$ are connected to a common lead 36; and the lower ends of potentiometers $R_1'$, $R_2'$, $R_3'$, $R_4'$, and $R_5'$ are connected to common lead 37.

As described in the said Wilcox application, each pair of these high resistors is arranged to be connected to its corresponding X potentiometer or M potentiometer through a reversing switch main so that the upper ends of the potentiometers $R_1$ to $R_5$ may be connected to the taps of the respective X or M potentiometers while the upper ends of potentiometers $R_1'$ to $R_5'$ are connected to the ground side of the respective X or M potentiometers, and vice versa.

The means for doing this in Fig. 1 are the switches $S_1$, $S_2$, $S_3$, $S_4$ and $S_5$. Each of these switches has a pair of arms 38 and 39. Each arm 38 is adapted to make contact with one of three corresponding switch points, labeled "+," "0" and "−"; and similarly each of the arms 39 makes contact with three similar switch points. The two arms 38 and 39 are mechanically connected together so that each arm is either on its left switch contact, its middle switch contact or its right switch contact. When the arms 38 and 39 are on their left hand switch contact, the resistors $R_1'$ to $R_5'$ may be connected to the X (or M) potentiometer taps and when the switch arms are thrown to the right hand contact, the resistors $R_1$ to $R_5$ may be connected to the potentiometer taps. When the switch arms are on their middle contact as shown in Fig. 1, the resistors are not across the potentiometers at all.

In order to connect the R resistors across the tapped off portions of the X and M potentiometers as just described, the uni-control device U should be turned to place its switches on their S contacts. In this position, the contacting of the $S''_0$ switch on the S contact connects the tapped portion of the corresponding X potentiometer to the respective pair of R resistors.

The leads 36 and 37 are connected across the primary winding 40 of a transformer T, the secondary winding 41 of which is led to a suitable alternating current indicator 42, preferably through an amplifier 43.

For the purpose of conveniently and accurately setting up the A and M quantities on the respective A and M potentiometers, and also for reading the values set on the X potentiometers after arriving at a solution, there is provided a potentiometer D. This forms with the respective ones of the A, M and X potentiometers a Wheatstone bridge arrangement; and this arrangement is described in Berry application Serial No. 610,457. The potentiometer D is connected across bus bars 32, 33 and consequently is adapted to be connected across any of the A and M potentiometers by appropriate switching of them to contacts $a$, $b$, $c$. The potentiometer D is also adapted to be connected across the X potentiometers by moving the $S_0$ switches to their X position. Two adjacent arms of the bridge are the portions 44 and 45 on either side of the adjustable tap 46 of potentiometer D; and the other two arms are the portions on either side of the tap of the selected A, M or X potentiometers.

The switch $S_c$ and the upper right hand switch $S_0$ in Fig. 1 enable the output of the bridge (at the taps of potentiometer D and of the selected A, M or X potentiometers) to be connected through high resistors $R_5$ and $R_5'$ across the primary of transformer T; so that the condition of bridge balance will be indicated by a null reading of indicator 42.

Assume, for example, that it is desired to set up a numerical quantity for $A_{11}$ on potentiometer 7. For this purpose, the contact $a_1$, $b_1$ and $c_1$ of the top row of potentiometers will be connected to the respective contacts $a$, $b$ and $c$ of the switch sets; and the switches $S_0$, $S'_0$ and $S''_0$ will be moved to their A contacts as shown in Fig. 1. This will place the potentiometer terminals $a_1$ and $c_1$ across the bus bars 32 and 33 respectively, and will connect the tap terminal $b_1$ to switch point 1 of the column switch $S_c$. The potentiometer D already has its terminals connected across the bus bars 32 and 33; and it has its tap 46 connected to the A contact of its $S_0$ switch. Now the value of $A_{11}$, for example .5429, may be set up on potentiometer D by moving its adjustable tap 46 until .5429 of the total voltage across potentiometer D from ground appears at tap 46. Since potentiometer D is preferably a pure resistance, the resistance tapped off will be in direct proportion to the voltage tapped off, and accordingly it is only necessary to tap off .5429 of the total resistance across the potentiometer. This may readily be done, for example, by putting a scale from 0 to 1.000 on the potentiometer and moving the taps to the reading of .5429.

With the $S_c$ switch on its contact 1, the reversing switch $S_5$ may be set in the position shown in Fig. 1 so as to connect potentiometer tap 46 with resistor $R_5'$ and to connect the tap $b_1$ of potentiometer 7 to the high resistor $R_5$, thereby placing the output of the bridge across the primary winding 40 of transformer T. After doing this, the operator should move the adjustable tap of potentiometer 7 until the null indicator reads null. This will indicate that the same voltage, namely .5429 of the total voltage E is set up at the tap of potentiometer 7.

All of the other known potentiometers may be set up in the same way; for example, the required setting for the value of $A_{22}$ will be set up on potentiometer 13 by moving these potentiometer terminals $a_2$, $b_2$ and $c_2$ to the corresponding switch terminals $a$, $b$ and $c$. As $A_{22}$ is in the second column, the column selector switch $S_c$ will be moved to its tap 2 to pick off the voltage at the tap $b_2$ of potentiometer 22. The setting of this tap will then be adjusted by setting up the required value on potentiometer D and reaching a null indication in the same way as described above for the $A_{11}$ value.

The switch points marked S on the $S_0$, $S'_0$ and $S''_0$ switches are the positions for obtaining solutions of the equations; because in this position the tapped-off portions of the X potentiometers and of the M potentiometers are connected with the R resistors, so that null indicator 42 can indicate by a null reading when the summation called for by the equations is satisfied. After the solutions are obtained, as indicated by the null indications, the values appearing at the taps of the X potentiometers are the numerical values of the solutions; and to read these values the uni-control U may be turned to the X contacts. In this position the Wheatstone bridge arrangement will give a reading of each X value which is set up. To do this, the column selector switch $S_c$ may first be placed on its contact 1 which will connect potentiometer 3 into the bridge; and the value of $X_1$ will be set up at the tap 46 of the bridge potentiometer D. Similarly, after turning switch $S_c$ to its contact 2, the value for $X_2$ set up on potentiometer 5 can be ascertained; and moving the switch $S_c$ to its contact 3 will give the value of $X_3$; and moving $S_c$ to its contact 4 will give the value of $X_4$.

Solutions of the equations are obtained in the manner described in the said Berry and Wilcox applications. This is done by successively connecting to the bus bars 32 and 33 the A and M potentiometers for the successive equations, and temporarily solving for one of the X's in each successive position. For example, Equation 1 may first be considered; and to do this, the potentiometers 7 to 11 will have their contacts $a_1$, $b_1$, $c_1$ connected to the respective contacts $a$, $b$ and $c$, at the bus bars. Then a summation according to Equation 1 will be had on the addition system whenever the null indicator reads zero. The null indicator may thus be made to read zero by mutually adjusting the X potentiometer taps until the zero is obtained. As a practical matter, all but one of the taps of the X potentiometers may be set at zero arbitrarily, and the first X potentiometer, for example potentiometer 3, may be adjusted to obtain the null. This will give some arbitrary value for $X_1$, which however will not be the ultimate solution of the simultaneous equation, but will merely be an intermediate solution. Then with this initial value of $X_1$ remaining on the potentiometer 3, the A and M potentiometers for the next Equation 2 may be set in the position of the bus bars. For this purpose the points $a_2$, $b_2$, $c_2$ of potentiometers 12 to 16 will be set at their respective $a$, $b$ and $c$ contacts. Then with the value of $X_1$ thus obtained still remaining on potentiometer 3, potentiometer 4 may have its tap moved until a null reading is again obtained, and this will give an intermediate setting of $X_2$. In like manner, intermediate settings of $X_3$ and $X_4$ may be obtained. After this, the operation may be again and again repeated, and at each setting of a row of the A and M potentiometers, a new X value will be set up, and these successively new X values will bring the system closer and closer to an ultimate solution of the simultaneous equations. A number of cycles of operation may be required before the final X values are obtained; and the operator will know when these final values are obtained because the same set of X values will satisfy all equations, that is, will produce a null reading no matter which row of A and M potentiometers are connected to the bus bars 32 and 33.

After the ultimate solutions are thus obtained, the actual values of $X_1$, $X_2$, $X_3$ and $X_4$ set up on their respective potentiometers may be read off by means of the Wheatstone bridge as described above.

The cabinet and mechanism illustrated in Figs. 2 to 7 are adapted to contain apparatus like that shown in Fig. 1 and to provide for switching of the characters shown in Fig. 1. The equipment is housed in a cabinet 50. There is placed in a horizontal position within the upper portion of the cabinet a shaft 51 and this is supported within suitable bearings 52 and 53 mounted within the cabinet. There is fastened on shaft 51 a number of drums 54 and there should be as many of these drums as there are vertical columns of potentiometers representing the known A and M values in Fig. 1. Thus, if there are as many as four simultaneous equations to be solved, they could be taken care of by the system of Fig. 1 and five drums would be required. If the number of simultaneous equations is greater, for example twelve, there would be a correspondingly greater number of rows and columns of potentiometers in the circuit of Fig. 1, and there would have to be thirteen drums. These thirteen drums would take care of any number of simultaneous equations from two to twelve. Each drum is provided with a circular web 55 extending from the periphery to an inner central hub 56 mounted on shaft 51; and the hubs are fitted securely to the shaft so that rotation of the shaft will rotate all the drums together.

The several drums are placed to abut each other as shown in Fig. 3; and the circular rim 54a of each drum (except the last) is adapted to fit into a corresponding peripheral groove 54b of the next drum. Each drum is provided with a number of holes at uniformly spaced intervals around the periphery of the drum, and there should be as many of these holes as there are potentiometers in a vertical column in Fig. 1. As shown in Figs. 3 and 6, there are twelve of these holes. An individual potentiometer 57 is mounted inside each hole. The potentiometers are preferably of the construction shown in Fig. 7. This is a well known type comprising a coil of wire placed in a cylindrical container 57a, with the terminal wires brought out from the sides, as shown. The middle lead is from the adjustable tap from a rider within the cylinder which rides around on the coil by turning the shaft 57b by its knob 58.

The adjustable knob 58 for the adjustable tap of each potentiometer, protruding through the hole as shown. Thus, in the mechanical arrangement illustrated, there is room for twelve potentiometers on each drum which would correspond to a vertical column of twelve potentiometers in Fig. 1. This would enable the system to solve up to twelve simultaneous equations.

Each potentiometer has the circuit diagram of one of the A or M potentiometers of Fig. 1, that is it has three leads, one lead from each end and a lead from the adjustable tap, the position of the tap being regulated by the rotatable knobs 58. These leads correspond to the terminals marked $a_1$, $b_1$, $c_1$ and $a_2$, $b_2$, $c_2$, etc., in Fig. 1. The three respective leads are soldered to the inner ends of switch points 63 which are individually marked $a_1'$, $b_1'$, $c_1'$ (Fig. 3). The three switch points are set in a cylindrical insulating member, for example of a plastic material 59, which is set into cut-outs of the periphery of the drum. There is provided an individual one of these cylindrical members for each potentiometer on the drum; and each insulating member carries the three switch points connected to the respective output leads of the respective potentiometers. Thus, there is a plug 59 for each potentiometer on the drum, and these plugs are spaced at uniform distances around the periphery of the drum as shown in Fig. 6. The switch contacts $a_1'$, $b_1'$ and $c_1'$ are adapted to be engaged by corresponding switch members 60 which are held in a fixed position. Each contact member 60 comprises a pair of fingers 61 and 62, and the switch members 63 are adapted to be engaged between the respective pairs of the switch fingers. The pairs of switch fingers 60 are designated $a$, $b$ and $c$ as they correspond with the switch points $a$, $b$ and $c$ of Fig. 1.

There is a set of the switch contacts 60 for each drum, so that as the drum is rotated the successive sets of contacts 63 successively engage the finger contacts for that drum. The set of contacts 60 of each group are mounted by screws and spacers 64 to the arm 65; the opposite end of which is fastened to a bar 66 which is fastened to the cabinet.

As there are thirteen of the drums for a machine adapted to solve for twelve simultaneous equations, there will be correspondingly thirteen of the switch contact sets 60. Each switch contact will be positioned so that when the drums are rotated in unison, each switch 60 will be engaged by the three contact points 63 of one row of A and M potentiometers.

To enable the successive rows of switch points at 63 successively to engage the switch contact 60, there is provided on the rotatable shaft 51 a hand-wheel 67. Rotation of the hand-wheel will rotate shaft 51 together with all of the drums which are fixed to it. To enable each successive switch contact row on the drum to stop exactly when engaged by the fingers of the switch sets 60, there is provided a detent mechanism associated with the hand-wheel on shaft 51. This mechanism comprises a cam member 68 provided with uniformly spaced detents 69. There are as many of these detents as there are rows of switch contact sets on the drums. In this case, there will be twelve of the detents around the periphery of the cam member. The cam member is provided with arms 90, and the hand-wheel 67 is fastened to these arms, so that when the hand-wheel is turned the cam turns with it.

For stopping the cam in its proper successive positions, there is provided a detent mechanism comprising a lever 70, pivoted at 70a to the cabinet and provided near its unpivoted end with a roller 71 which protrudes through a hole in the cabinet and rolls on the periphery of the cam. A tension spring 72 is provided at unpivoted end of lever 70, tending to hold the roller against the periphery of the cam. The result of this arrangement is that every time a cam detent 69 moves adjacent the roller, the roller drops into the detent, thereby stopping the cam in this position. A pull of the hand-wheel, however, is sufficient to move the cam on again so that the roller will again ride on the cam's periphery until it drops into the next detent. The detents are so spaced that each time the roller drops into a successive detent, the next successive row of switch sets is engaged by the fingers of switch contacts 63.

To insure that the switch fingers 63 will always be positioned to enter between the corresponding pairs of switch contacts 60, provision is made to maintain accurate adjustment in spite of inaccuracies and slight bending which may occur in the supporting cabinet. For this purpose, there is provided an idling roller 75 on a pin 75a which is fastened to rod 66. The pin passes through a slot 66a in the rod so that it may be moved lengthwise along the shaft to some extent, and held in a desired position by tightening nut 75b. The idler is adapted to roll on and maintain engagement with the end wall of the leftmost drum. The other end of the rod 66 is provided with a groove 66b adapted to retain a suitable spring which may be a strip spring member 76 as shown. Spring 76 is supported by suitable rivets 77 at its lower end and is sprung to tend to maintain the roller 75 against the drum walls. By suitably adjusting the position of the roller pin on rod 66, the correct lengthwise position of rod 66 is found so that the position of the switch contacts will always be maintained relative to the position of the drums which bear the opposite switch members.

By means of this drum and switch mechanism, the switching of the successive rows of A and M potentiometers in Fig. 1 may easily be accomplished. For example, with the drum in its first position, the three contacts at each of the potentiometers 7, 8, 9, 10 and 11 will be connected with the switch contacts 60, that is, to their respective contacts $a$, $b$ and $c$ in Fig. 1. Rotation of the hand-wheel to the next detent position will then bring the next row of potentiometers 12, 13, 14, 15 and 16 into engagement with contacts $a$, $b$ and $c$. Likewise, moving the hand-wheel to the next detent position will bring the third row of potentiometers 17, 18, 19, 20 and 21 into position with switch contacts $a$, $b$ and $c$. This will be continued throughout all the detent positions at the hand-wheel.

A window 80 is provided extending along the front of the cabinet so as to expose adjustable knobs 58 of the particular row of A and M potentiometers which are connected with the switch sets 63. Thus, after the hand-wheel has turned to the desired row of known potentiometers, the individual values required to be set up on these potentiometers by the particular equation being solved, are then set up by adjustment of the potentiometer knobs through the window. The other switching operations indicated in the circuit diagram of Fig. 1, are carried out by the other switching apparatus mounted on the cabinet. The knob 81 at the left side of the cabinet is mechanically arranged inside the cabinet to control all of the $S_0$, $S'_0$ and $S''_0$ switches according to the uni-control arrangement shown in Fig. 1. This may be done in any well-known manner which is understood in the art and requires no further detailed explanation here. The rotary knob 62 shown on the front of the cabinet to the left of the center provides the adjustment for the column selector switch $S_c$; and again this connection inside the cabinet requires no detailed explanation, as it merely involves a mechanical connection.

The knobs 83, 83a, 83b, and 83c are the knobs for controlling the adjustment of the tap 46 on potentiometer D. As explained heretofore, it is preferred to have this potentiometer D of the decade type. Since the well-known decade type of potentiometer comprises a number of parallel potentiometer circuits, each having an adjustment, in order to obtain an accurate overall adjustment, there are herein shown four such decade potentiometer adjustments. The row of switches 84, 84a, 84b ... 84l are for the respective switches $S_1$, $S_2$, $S_3$, shown in Fig. 1, for switching the R resistors. As shown in Fig. 1, each of these switches comprises two switch contacts 38 and 39, adapted to switch over any one of three contact points. Accordingly, switch knob 84 is adapted to move to the three corresponding switch positions. In the position shown in Fig. 2, the switches 84 occupy the central positions shown in Fig. 1. The bottom row of knobs, 85, 85a, 85b ... 85k are the knobs for adjusting the respective taps of the X potentiometers 3, 4, 5. The window 86 contains the null indicator having an indicating needle 87.

In practice, the operator of the computer shown in Fig. 2 will move the hand-wheel to bring one of the rows of A and M potentiometers into position at the window 80. This will for example, present the knobs 58 for the first equation. He will then set up the values of the known coefficients on this row of potentiometers. To do this, the selector switch knob 81 will be turned to its leftmost position to put all of the $S_0$, $S'_0$, and $S''_0$ switches on their contacts A as shown in Fig. 1. Then by use of the column selector switch $S_c$, he will successively connect the known potentiometer to the decade potentiometer D. This will set up the Wheatstone bridge, and the output of the bridge will go through high resistors $R_5$ and $R_5'$ to the opposite sides of the null indicator. By adjustment of the decade potentiometer knobs 83, 83a, 83b and 83c, he will set up at the output tap of this potentiometer a resistance value corresponding to the numerical quantity $A_{11}$. Then by manipulation of the $A_{11}$ potentiometer knob 58a, he will produce a null reading at needle 87, indicating that potentiometer 7 is now set with the value set up on the decade potentiometer D. Then the column selector $S_c$ may be moved to column 2, and this will place the second potentiometer 8 in circuit with the Wheatstone bridge. The value of $A_{12}$ in the equation will now be arbitrarily set up on the decade potentiometer as before, and by manipulation of the knob $58a$ for potentiometer 9, the value of $A_{12}$ will be set up. Then the column selector $S_c$ will be moved to the third column, and so on until all of the first row of the A and M potentiometers are adjusted.

Then the hand-wheel may be turned to the next detent position to put in the next row of A and M values, $A_{21}$, $A_{22}$, $A_{23}$, etc., and these known values will be set up in the same way as for Equation 1. This procedure will be followed until all of the known A and M values are set up on the A and M potentiometers by the aid of the Wheatstone bridge arrangement. It should be noted that in order to set up the M values, the operational switch 81 must be moved to its M position.

After setting up these potentiometers, the operational switch may be moved to its righthand contact S, which is the "solve" position.

In this position, an intermediate solution may be had by setting at zero the taps of all the X potentiometers except the $X_1$ tap, for example, and then adjusting the $X_1$ tap for a null reading when the A potentiometers for Equation 1 are set into the operational position. Then the next equation may be solved by moving the next row of A potentiometers into the operational position and adjusting the $X_2$ potentiometer for a null reading, leaving all the other X potentiometers as they were. This step by step procedure converging towards an ultimate solution may be carried on as was heretofore described in connection with Fig. 1. After the final settings of the X potentiometers are had, the actual values set up on the X potentiometers, which are the solutions of the equations, may be had by moving the operational switch knob 81 so that the switches are on the X contacts. The $X_1$ setting may be ascertained by moving the column selector $S_c$ to position 1, which will set potentiometer 3 in relation with the Wheatstone bridge, from which the value on $X_1$ may be read on the decade potentiometer. Then the column selector can be moved to its contact 2 for column 2, and the $X_2$ setting ascertained by means of the Wheatstone bridge. This procedure may be followed to read all of the X values.

It will be recognized that by means of my turret or cylinder arrangement with the potentiometer contacts thereon, I have provided a switching system adapted to facilitate the switching of large numbers of successive electrical elements which are to be switched into circuit. The arrangement is especially useful as it enables the operator to perform the switching by turning the hand-wheel with one hand and make the potentiometer adjustments with the other hand.

My invention is not limited to the particular details of the apparatus shown and described in the drawings, but can be adapted to variations within the scope of the appended claims. It will be recognized that the switching system may be used with any desired number of potentiometers or electrical elements and with any desired number of rows of potentiometers or electrical elements; and is not in any way limited to the switching of the particular number of elements illustrated in the drawings.

I claim:

1. A switching mechanism comprising a rotatable cylinder, means for rotating the cylinder, a plurality of rows of potentiometers arranged at spaced intervals around the cylinder, each row extending substantially coaxial with the central axis of the cylinder, each potentiometer having an adjustable tap with a knob protruding through the cylinder for manual adjustment, switching means for connecting the terminals and the tap of each potentiometer in a row with circuit lines when the row is in operational position, whereby rotation of the cylinder successively places the several rows in operational position with the potentiometers of the row in switching contact with the switching means.

2. Apparatus according to claim 1, in which a cam and detent means is associated with the cylinder so that each time a row of potentiometers is connected with the switching means, the cylinder is held in the operational position by the detent.

3. A switching mechanism comprising a rotatable support, means for rotating the support, a plurality of potentiometers mounted on the support, a plurality of sets of contacts mounted on the support, each potentiometer having its terminal leads connected with an individual set of switch contacts, a plurality of sets of switch contacts mounted in a fixed position in relation to the contacts on the support so that when the support is rotated, the sets of switch contacts on the support successively make contacts with the ses of fixed switch contacts.

4. A switching mechanism comprising a rotatable hollow cylinder, means for rotating the cylinder, a plurality of adjustable-tap potentiometers mounted within the cylinder, each potentiometer having a tap-adjusting means extending through the cylinder, each potentiometer having its individual leads connected to an individual set of contact members mounted on the exterior of the cylinder, a plurality of sets of contact members mounted in fixed position and in relation to the contact members on the cylinder so that when the cylinder is rotated from one angular position to another, successive sets of the cylinder contacts make contact with the fixed contacts.

5. Switch contacting mechanism comprising a rotatable support, a plurality of rows of switch contact sets mounted on the support, a row of switch contact sets supported from a rod mounted in relation to the contact sets on the cylinder so that when the cylinder is rotated successive rows of cylinder contacts make contact with the fixed contacts.

6. Apparatus according to claim 5 in which the rod is provided with means for maintaining the fixed contacts in switching relation with the contacts on the cylinder, said means comprising a resilient spring for urging the rod longitudinally in one direction and a guide fastened to the rod and making contact with a portion of the cylinder to hold the rod against the endwise motion, said guide being positioned to maintain the switch contacts on the cylinder in contacting relation with the fixed contacts.

7. A switching mechanism comprising a hollow cylinder, means for rotating the cylinder about its longitudinal axis, a plurality of potentiometers arranged lengthwise along the cylinder and also around the cylinder, each potentiometer comprising a resistance element with a lead from each end of the element and a tap adjustable along the element, and a rotary means for adjusting the position of the tap, said potentiometers being fastened within the cylinder and having their rotary means extending through to the exterior of the cylinder, a plurality of sets of switch contacts with three contacts in each set, mounted on the exterior of the cylinder, there being a set of contacts for each potentiometer with the leads from the potentiometer elements and from the potentiometer taps connected to a respective contact of the corresponding set, a plurality of sets of switch contacts mounted in a fixed position in relation to the first-mentioned sets of contacts so that when the cylinder is rotated the sets of switch contacts which are mounted along the cylinder make contact successively with the fixed switch contacts.

8. Apparatus according to claim 7, in which the potentiometers within the cylinder are located in rows longitudinally along the cylinder and the number of sets of contacts mounted in fixed relation are sufficient to make contact with all the contacts in a row.

9. A switching mechanism comprising a hollow drum means, means for rotating the drum about its longitudinal axis, a plurality of adjustable-tap potentiometers arranged lengthwise along the drum and also around the drum, each potentiometer comprising a resistance element with a lead from each end of the element and from the adjustable tap, means for adjusting the positions of the taps, said potentiometers being fastened within the drum and having the tap-adjusting means extending to the exterior of the drum, a plurality of sets of switch contacts with three contacts in each set mounted on the drum, there being a set of contacts for each potentiometer, and the three leads from each potentiometer being connected to the respective contacts of the respective sets, a rod mounted near the drum, a plurality of sets of switch contacts mounted on the rod in relation to the rows of contacts on the drum, each set of switch contacts on the rod comprising three contacts positioned to make contact with the contacts of the respective sets on the drum, detent means associated with the drum for holding the drum in successive angular positions so that a corresponding row of switch contact sets makes contact with the contact sets mounted on the rod.

J C PEMBERTON.